United States Patent
Kasula et al.

(10) Patent No.: US 10,096,261 B1
(45) Date of Patent: Oct. 9, 2018

(54) MULTI-MODULE FILE ENCAPSULATION FOR COMPUTER-BASED COURSEWORK

(71) Applicant: The MathWorks, Inc., Natick, MA (US)

(72) Inventors: Santosh C. Kasula, Westborough, MA (US); Loren P. Dean, Natick, MA (US); Henry H. Atkins, Holliston, MA (US); Jarrod M. Rivituso, Reading, MA (US)

(73) Assignee: The MathWorks, Inc., Natick, MA (US)

( * ) Notice: Subject to any disclaimer, the term of this patent is extended or adjusted under 35 U.S.C. 154(b) by 469 days.

(21) Appl. No.: 14/818,918

(22) Filed: Aug. 5, 2015

(51) Int. Cl.
  *G09B 7/00* (2006.01)
  *G09B 19/00* (2006.01)
  *G09B 5/06* (2006.01)

(52) U.S. Cl.
  CPC ........... *G09B 19/0053* (2013.01); *G09B 5/06* (2013.01); *G09B 7/00* (2013.01)

(58) Field of Classification Search
  CPC ...... G09B 5/00; G09B 19/00; G06Q 30/0269; G05B 2219/35006
  See application file for complete search history.

(56) References Cited

U.S. PATENT DOCUMENTS

| | | | |
|---|---|---|---|
| 2004/0153509 A1* | 8/2004 | Alcorn | G06Q 30/06 709/205 |
| 2004/0194027 A1* | 9/2004 | Suzuki | G06F 17/218 715/209 |
| 2011/0219433 A1* | 9/2011 | Albrecht-Buehler | G06F 9/45533 726/4 |

OTHER PUBLICATIONS

Wikipedia, "edX", https://en.wikipedia.org/wiki/EdX, Jul. 29, 2015, 5 pages.
Wikipedia, "Massive open online course", https://en.wikipedia.org/wiki/Massive_open_online_course, Jul. 29, 2015, 23 pages.
Mullen "Introducing Wakari", http://continuum.io/blog/introducing-wakari, Continuum Analytics, Nov. 9, 2012, 5 pages.

* cited by examiner

*Primary Examiner* — Jerry-Daryl Fletcher
(74) *Attorney, Agent, or Firm* — Harrity & Harrity, LLP

(57) ABSTRACT

A device may receive a single artifact. The single artifact may encapsulate a group of modules with permissions associated with generating a user interface for computer-based coursework. A first module, of the group of modules, may be associated with a first permission of the permissions. A second module, of the group of modules, may be associated with a second permission of the permissions. The device may populate a user interface with information and one or more user interface elements based on the group of modules, the permissions, and a level of user of a user utilizing the user interface.

20 Claims, 17 Drawing Sheets

TECHNICAL COMPUTING ENVIRONMENT (TCE)

File  Edit  Tools  View  Execute

Instructor View | Student View

Assignment

Given an integer n, make an n-by-n matrix made up of alternating ones and zeros shown below. The a(1,1) should be 1.

Example:
Input
N=5
Output a is:
[1 0 1 0 1
 0 1 0 1 0
 1 0 1 0 1
 0 1 0 1 0
 1 0 1 0 1]

Reference Solution Solution Template
```
function a = checkerboard(n)
    a = ones(n)
end
```

Assessment Code (Test Suite)

Test 1
```
input = randi(10),
expected = reference.checkerboard(input)
assert(isequal(expected, actual0, 'Failed test 1')
```

☐ Hide Code

Test 2
```
input = randi(10),
expected = reference.checkerboard(input)
assert(isequal(expected, actual0, 'Failed test 2')
```

☐ Hide Code

⊞ Add Test

Files
⊞ Add Files

| Property | Value |
|----------|-------|
| Topic | Introduction to Programming |
| Subtopic | Matricies |

[Publish]

[View Student Version]

FIG. 1A

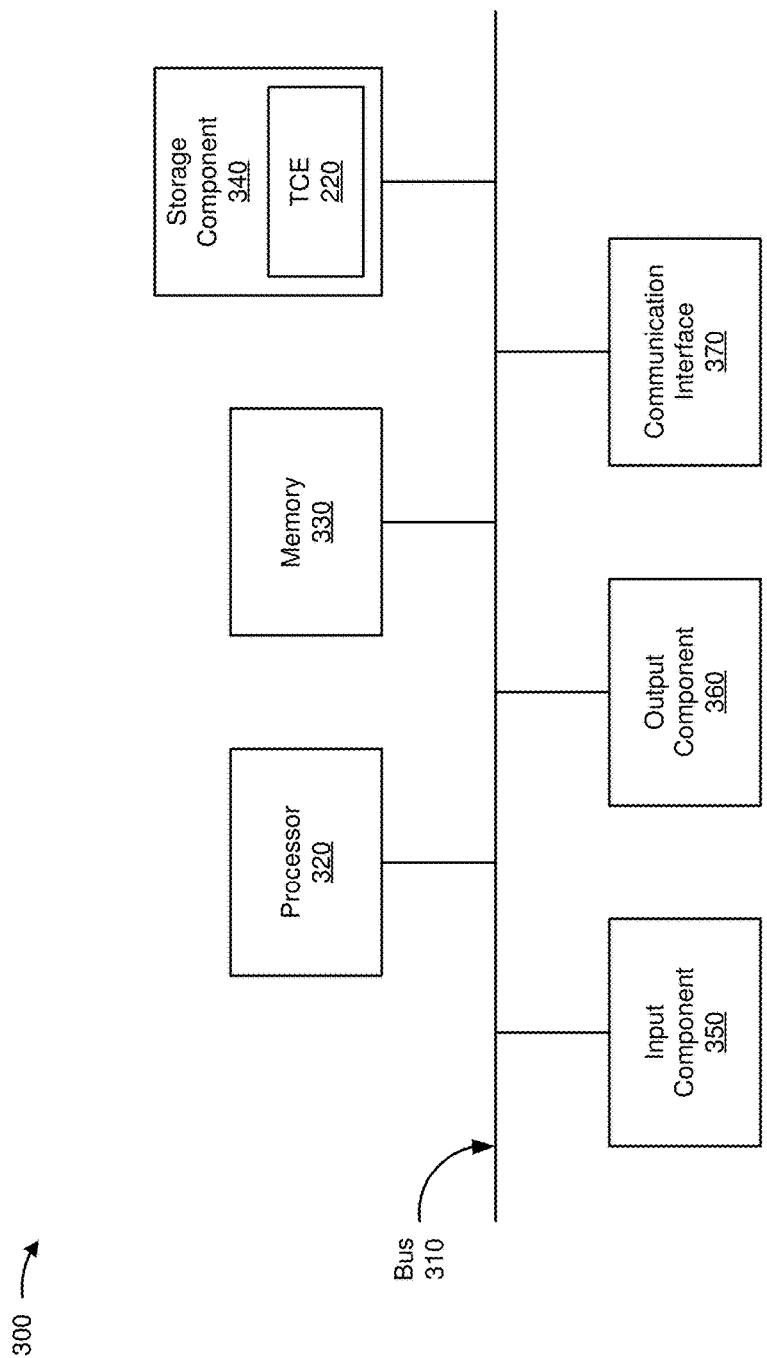

TCE 220

File   Edit   Tools   View   Execute

Instructor View | Student View

Assignment (502)

Falling body

An object is falling freely from a height of 2.2 meters under the force of gravity. Ignoring wind resistance, draw a diagram to compute the change in position, x(t), over time given the one dimensional equation of motion as:

$F = ma$

Where $a$ is the second derivative, $\ddot{x}$, of the position and is given as gravity, $g$.

Reference Solution (504)

-9.8 → g → Integrator1 $\frac{1}{s}$ → Integrator2 $\frac{1}{s}$ → Hit Crossing → Stop / Stop Sim. → Position

Assessment Model (506)

Files
⊞ Add File

Properties (508)

| Property | Value |
|----------|-------|
| Topic | Graphical Modeling |
| Subtopic | Integrators |

Publish   View Student Version

Assessment Code
⊞ Add Test

FIG. 5

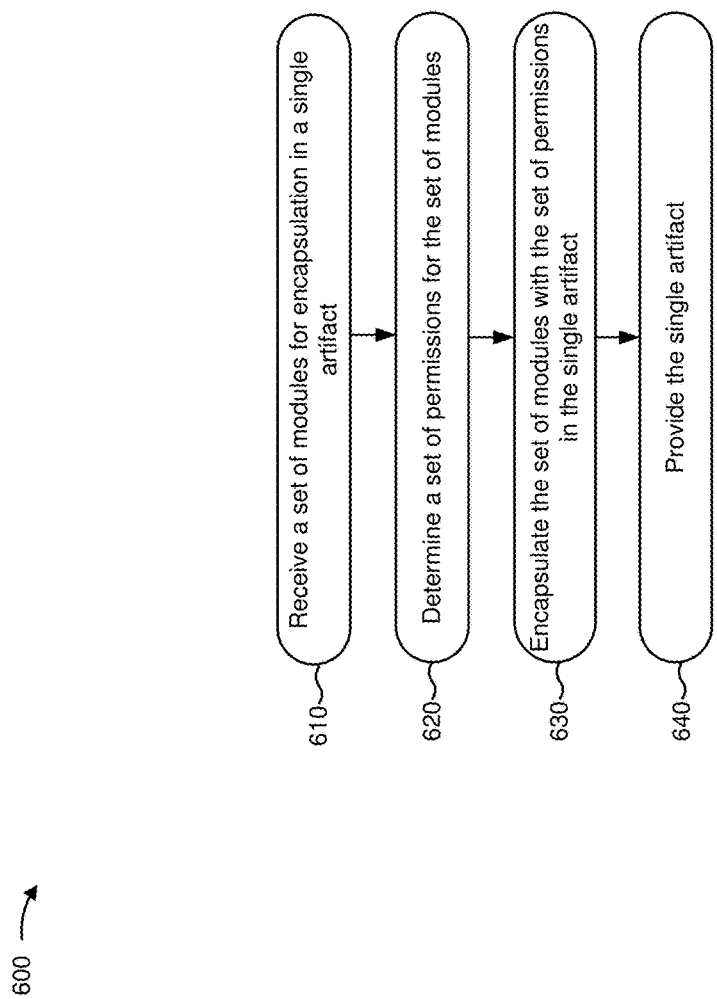

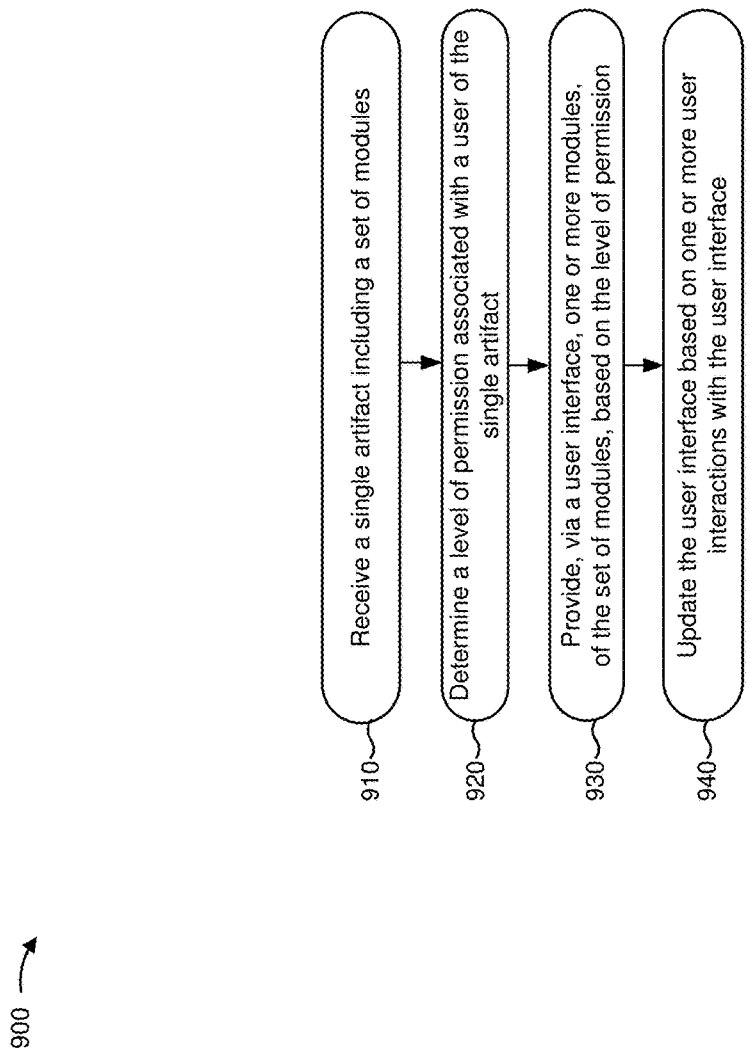

US 10,096,261 B1

MULTI-MODULE FILE ENCAPSULATION FOR COMPUTER-BASED COURSEWORK

BRIEF DESCRIPTION OF THE DRAWINGS

FIGS. 1A and 1B are diagrams of an overview of an example implementation described herein;

FIG. 3 is a diagram of example components of one or more devices of FIG. 2;

FIG. 5 is a diagram of an example implementation of generating an educational artifact that encapsulates a set of modules;

FIG. 6 is a flow chart of an example process for generating an educational artifact that encapsulates a set of modules;

FIG. 9 is a flow chart of an example process for utilizing an educational artifact that encapsulates a set of modules.

DETAILED DESCRIPTION

Figure 1B:
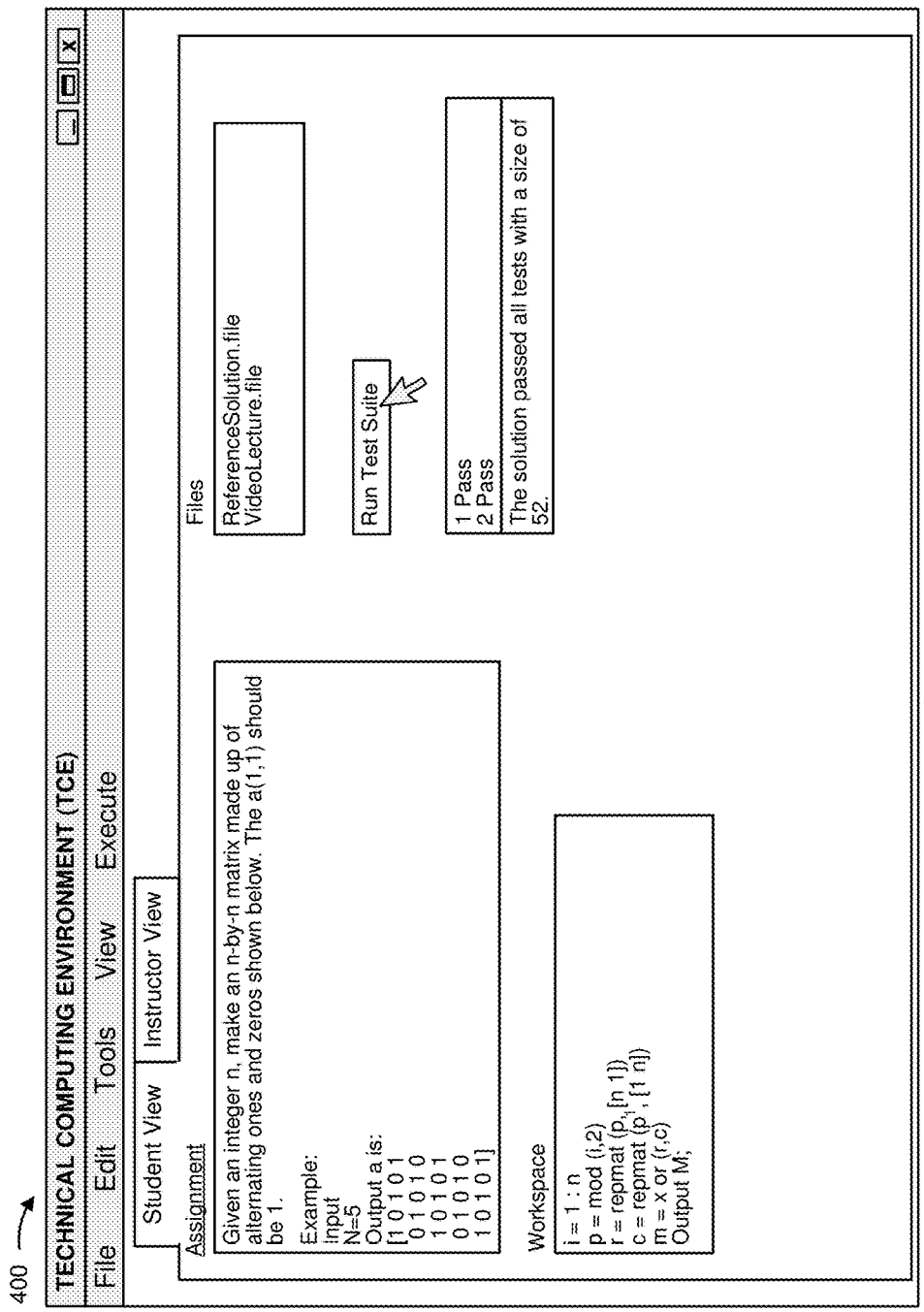

The following detailed description of example implementations refers to the accompanying drawings. The same reference numbers in different drawings may identify the same or similar elements.

Computer-based coursework may be distributed online via a software application, a web application, or the like. The computer-based coursework may facilitate distributed learning, distributed coursework completion, or the like. For example, a student in the United States may receive educational instruction from a teacher in England via a streaming video. The student may complete coursework designed by the instructor to emphasize the educational instruction. The coursework may relate to computer programming, graphical model design, or the like. For example, the coursework may include a problem for which program code is to be written. As another example, the coursework may include a segment of program code for which a student is to select a correct graph representing output from execution of the segment of program code. As another example, the coursework may include a description of a system for which the student is to create a graphical model, execution of which simulates the system.

Computer-based coursework may be associated with multiple modules. A module may refer to a portion of computer-based coursework, such as an assignment portion, a reference solution portion, a test suite portion, a solution template portion, or the like and/or a portion of a user interface associated therewith. For example, computer-based coursework may be associated with an assignment module that a teacher authors in plain text and that is provided for viewing by a user via a text viewer. As another example, the computer-based coursework may be associated with a test suite module that is utilized to evaluate a student solution. As another example, the computer-based coursework may be associated with a set of supporting files. The student may download one or more files onto a client device and load the one or more files into a development environment, such as an integrated development environment (IDE), with which to author program code to complete the computer-based coursework. Upon completion, the student may upload a solution to a web platform associated with the computer-based coursework so that a set of tests may be executed to evaluate the solution. On a server device associated with the web platform, the solution may be loaded into a test suite and evaluated based on one or more tests of the test suite.

However, utilizing multiple separated modules on multiple devices may result in files being lost. Additionally, or alternatively, such a system may be associated with compatibility issues between different programs that are to execute each module, different computing platforms being utilized for different portions of the computer-based coursework, or the like. The instructor and the student may utilize different versions of a computer-based coursework platform, which may require excessive data storage, excessive processing cycles (e.g., utilized to convert data from a first format associated with a first version of the platform to a second format associated with a second version of the platform), or the like. When functionalities of the computer-based coursework are required to be separated between multiple client devices and servers, a network connectivity problem may prevent completion of the computer-based coursework.

Implementations, described herein, may encapsulate a set of modules into a single executable artifact. When the single executable artifact is executed via a computer-based coursework platform, the computer-based coursework platform may provide end-to-end computer-based coursework with multiple permission levels. The multiple permission levels may facilitate distribution of the set of modules to users that are not authorized to view one or more modules of the set of modules, edit one or more modules of the set of modules, or the like. In this way, computer-based coursework may be improved by reduced data storage, reduced processing cycles, improved interoperability between versions of computing platforms, and/or improved user experience relative to a configuration utilizing multiple artifacts and/or multiple separated files. Moreover, by utilizing a single artifact, tools (e.g., program code analysis tools) may be incorporated that improve generation of the computer-based coursework, such as utilizing static analysis on a solution template. Additionally, or alternatively, restrictions may be incorporated, such as by the artifact including information indicating that a particular function library is not to be permitted for utilization by a student solving a problem. Additionally, or alternatively, the single artifact may encapsulate information necessary to provide the problem for a student without the student being provided all modules that are provided to an instructor, such as providing an execution environment for the student without providing a solution environment.

Implementations are described herein in terms of being utilized in the context of a technical computing environment (TCE); however, implementations, described herein, may be utilized in a non-TCE context.

FIGS. 1A and 1B are diagrams of an overview of an example implementation 100 described herein. As shown in FIG. 1A, a client device may generate, for display to a user, a user interface with which to edit one or more modules for encapsulation in a single artifact (e.g., an educational artifact). An artifact may refer to a file associated with a particular file extension that is executable by a particular program. For example, an artifact may encapsulate a set of modules. Execution, by the client device, of a program into which the artifact is loaded may facilitate providing information associated with the set of modules to a user via a user interface of the program. The artifact may include a set of permission based views. A view may refer to a particular set of information associated with the artifact that is displayed via the user interface. For example, the client device may cause information to be displayed that is associated with an instructor view (e.g., a level of view that facilitates creation of computer-based coursework), a student view (e.g., another level of view that facilitates completion of computer-based coursework), or the like. The client device may cause the instructor level view to be provided based on a credential provided by a user. The credential may be associated with determining that the user has permission to view information included in the artifact. For example, the user may provide a password, utilize a known Internet Protocol (IP) address, or the like.

As further shown in FIG. 1A, the instructor view may include information associated with a set of modules for encapsulation in an artifact, such as an assignment module, a reference solution module, and a test suite module. The assignment module may include information associated with a computer-based coursework assignment. For example, the assignment module may include information identifying program code that is to be written. In another example, the assignment module may include a multiple choice problem for which a particular multiple choice answer is to be selected. In another example, for a graphical modeling assignment the assignment module may include one or more model elements of a graphical model. The reference solution module may include a solution template to be used as a guideline for a student, to which a student solution is to be compared, or the like. The test suite module may include a set of tests against which a student solution may be evaluated. Other modules are possible that differ from the modules described herein.

As further shown in FIG. 1A, the instructor view may facilitate receiving a selection of a set of files to be included with the artifact. For example, a teacher may include a supporting file for an assignment that requires authorship of program code. The instructor view may facilitate selection of a set of properties for the artifact. For example, the client device may receive input indicating a topic for the assignment, a subtopic for the assignment, a set of students to whom the assignment is intended, or the like. In another example, the client device may receive one or more contextual restrictions. For example, the client device may receive input indicating that a particular set of functions are not permitted in a student solution and may include information associated with invalidating the particular set of functions during evaluation of the student solution. The client device may receive information associated with generating and/or editing one or more modules. For example, the user (e.g., a teacher) may provide input associated with creating the assignment, creating a reference solution, creating assessment code, or the like. The client device may generate information associated with a module based on analyzing the set of modules. For example, the client device may generate a set of tests based on the assignment module and/or the reference solution module.

Based on a user interaction (e.g., a mouse click on the "Publish" button), the client device may encapsulate the set of modules into a single artifact that may be distributed to other client devices associated with other users (e.g., students), thereby facilitating completion of computer-based coursework. The client device may include a set of permissions for one or more aspects of the set of modules. An aspect of a module may refer to a view and/or usage of the module, such as a presentation in which a user may edit information of a module, a presentation in which a user may view information of a module, a presentation in which a user may view a portion of information of a module (e.g., a hint for a solution but not the solution), or the like. For example, the client device may include information associated with indicating that information associated with a particular module is only intended for display to an instructor user and not for display to a student user.

As shown in FIG. 1B, client device may provide a student view of information associated with the set of modules of the artifact. For example, the client device may receive a student level credential from a user, and may select information, for display, from one or more modules associated with student level permission. The client device may provide the assignment module and a workspace module. The workspace module may include a programming workspace with which a user may author a solution to the assignment. The client device may provide an indication of a set of files included in the artifact. For example, the client device may provide an indication of a reference solution file, a video lecture file, or the like. The client device may provide an aspect of the test suite module in the student view. For example, the client device may provide a user interface element (e.g., a button) that a user may utilize to cause the client device to evaluate the student solution. Further to the example, the client device may provide a test console with which to output results of evaluating the student solution.

In this way, a client device may generate a single artifact that encapsulates multiple modules with a set of permissions and share the artifact with one or more other users, thereby facilitating reduced likelihood of file loss, better interoperability, and cross module integration (e.g., client device may generate information of a first module based on information of a second module), or the like relative to distributing educational modules via multiple artifacts.

Figure 2:
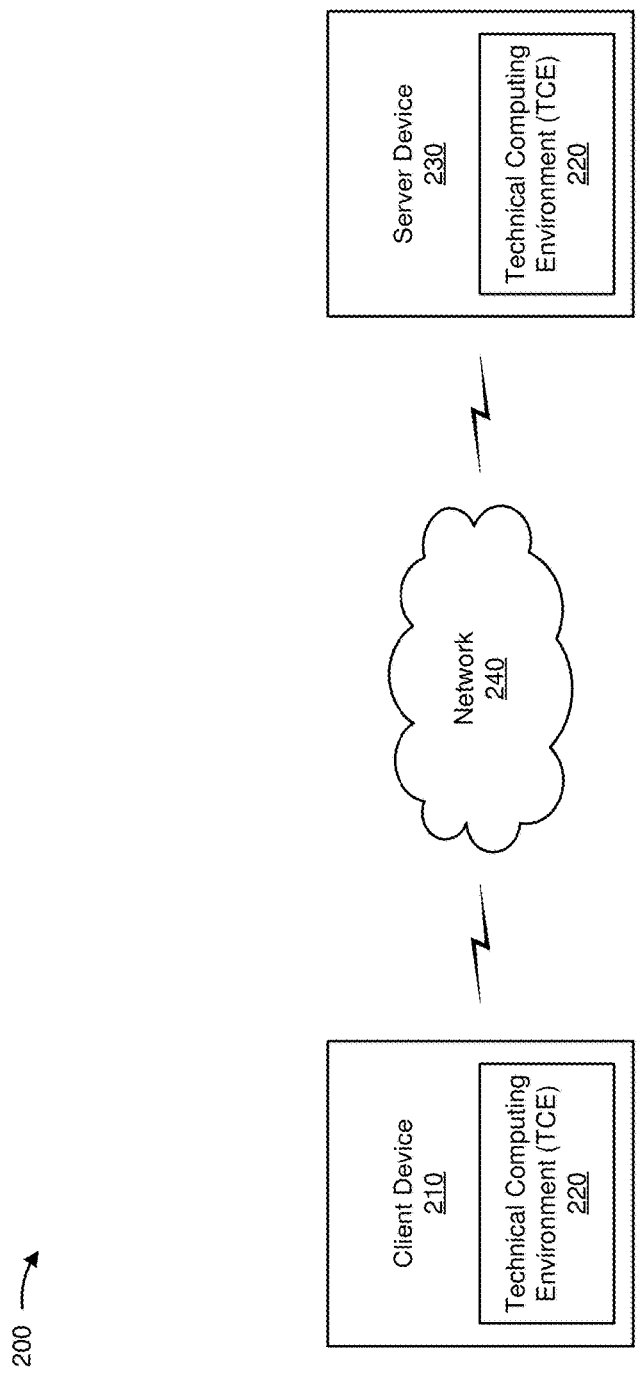
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, processing, and/or providing information associated with an artifact that includes a set of modules associated with computer-based coursework. For example, client device 210 may include a computing device, such as a desktop computer, a laptop computer, a tablet computer, a mobile phone (e.g., a smart phone, a radiotelephone, etc.), or a similar device. Client device 210 may generate an artifact by encapsulating a set of modules into a single artifact. Client device 210 may utilize an artifact by de-encapsulating one or more modules, of a set of modules, of the artifact and providing information associated with the one or more modules via a user interface. For example, client device 210 may provide a graphical user interface (GUI) for creating, editing, viewing, and/or interacting with one or more modules and/or information associated therewith. In some implementations, client device 210 may receive information from and/or transmit information to server device 230.

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software by The MathWorks, Inc.; Octave; Python; JavaScript; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dassault Systemes; etc.), a graphically-based environment (e.g., Simulink® software, Stateflow® software, SimEvents® software, Simscape™ software etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment. In some implementations, TCE 220 may include, for example, a user interface and/or enable simulation and execution of hardware and/or software systems. In some implementations, TCE 220 may include a high-level architecture (HLA) that facilitates performing a simulation, such as performing a distributed simulation.

TCE 220 may be integrated with or operate in conjunction with a modeling environment, which may provide graphical tools for constructing models (e.g., graphical models) of systems and/or processes. For example, an artifact may include an assignment associated with graphical modeling and one or more modules for designing a graphical model, viewing a graphical model, executing a graphical model, or the like. TCE 220 may include additional tools, such as tools designed to convert a model into an alternate representation, such as an alternate model format, code or a portion of code representing source computer code and/or compiled computer code, a hardware description (e.g., a specification of a digital circuit, a description of a circuit layout, etc.), or the like. TCE 220 may also include tools to convert a model into project files for use in an integrated development environment (IDE) such as Eclipse by Eclipse Foundation, IntelliJ IDEA by JetBrains or Visual Studio by Microsoft. A model (e.g., a graphical model) may include one or more model elements that simulate characteristics of a system and/or a process. Each model element may be associated with a graphical representation thereof that may include a set of objects, such as process blocks (e.g., block diagram blocks), ports, connector lines, or the like.

Server device 230 may include one or more devices capable of receiving, generating, storing, processing, and/or providing a model and/or information associated with an educational artifact that includes a set of modules. For example, server device 230 may include a computing device, such as a server, a desktop computer, a laptop computer, a tablet computer, or a similar device. In some implementations, server device 230 may host TCE 220. In some implementations, client device 210 may be used to access one or more TCEs 220 running on one or more server devices 230. For example, multiple server devices 230 may be used to execute program code (e.g., serially or in parallel) and may provide respective results of executing the program code to client device 210. In some implementations, server device 230 may include multiple TCEs 220, such as via a set of virtual machines.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution).

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks. In some implementations, network 240 may include one or more heterogeneous networks, such as a set of networks including an open-public network, a private network, or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of example components of a device 300. Device 300 may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions, and/or that is designed to implement one or more computing tasks. In some implementations, processor 320 may include multiple processor cores for parallel computing. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIGS. 4A-4D are diagrams of an example implementation 400 of generating an educational artifact that encapsulates a set of modules.

Figure 4A:
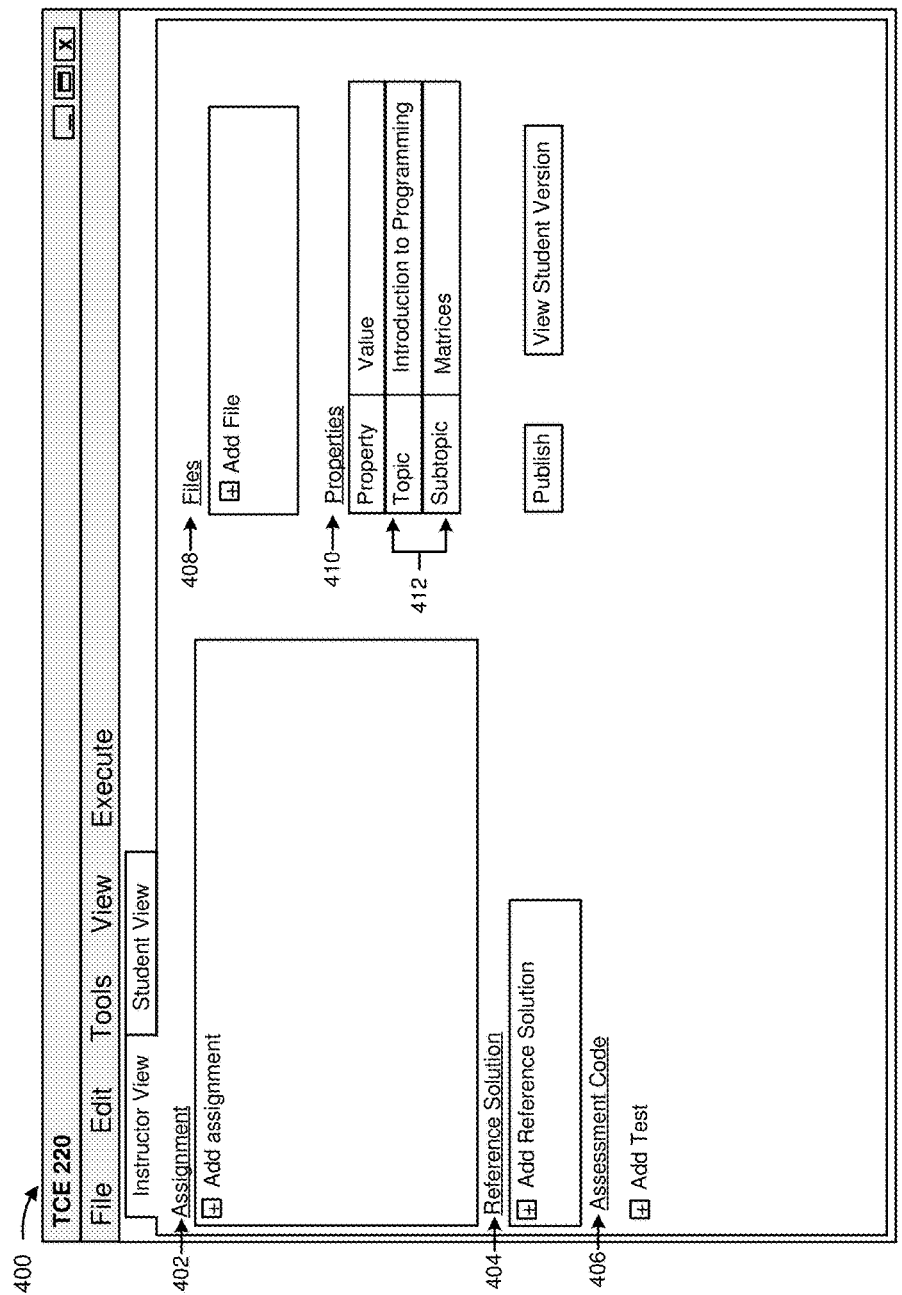
FIGS. 4A-4D are diagrams of an example implementation of generating an educational artifact that encapsulates a set of modules.

As shown in FIG. 4A, client device 210 provides a user interface (e.g., of an educational application) with which an instructor is permitted to provide information for a set of modules that are to be encapsulated in a single artifact. As shown by reference number 402, the artifact (as configured prior to user customization) includes an assignment module 402 without associated information. Assignment module 402 may include a coursework assignment for one or more students. As shown by reference number 404, the artifact includes a reference solution module 404 without associated information. Reference solution module 404 may include a reference solution and/or a solution template that is intended for utilization in evaluating a student solution (e.g., client device 210 may determine a programmatic complexity of the student solution relative to the solution template, a quantity of instructions (lines of code, methods, etc.) in the student solution relative to the solution template, a quantity of model elements of the student solution relative to the student solution, or the like). The solution template may be utilized by client device 210 to generate a set of tests, using an automatic test generation capability of TCE 220.

As further shown in FIG. 4A, and by reference number 406, the artifact includes an assessment code module 406, which is associated with a test suite module, without associated information. Assessment code module 406 may include program code associated with evaluating a student solution. As shown by reference number 408, the user interface may include a user interface element to facilitate inclusion of a set of files into files module 408. Files module 408 may include support files associated with the single artifact (e.g., a reference solution file, a video lecture file, a set of program code libraries for utilization in executing a student solution, or the like). As shown by reference number 410, the artifact may include a properties module 410. Properties module 410 may store information regarding the single artifact, such as a course title, a course topic, one or more restrictions (e.g., a program code library that the student is not to utilize or the like). As shown by reference number 412, client device 210 receives information for properties module 410 (e.g., a topic property, "Introduction to Programming," and a subtopic property, "Matrices," for the artifact).

Figure 4B:
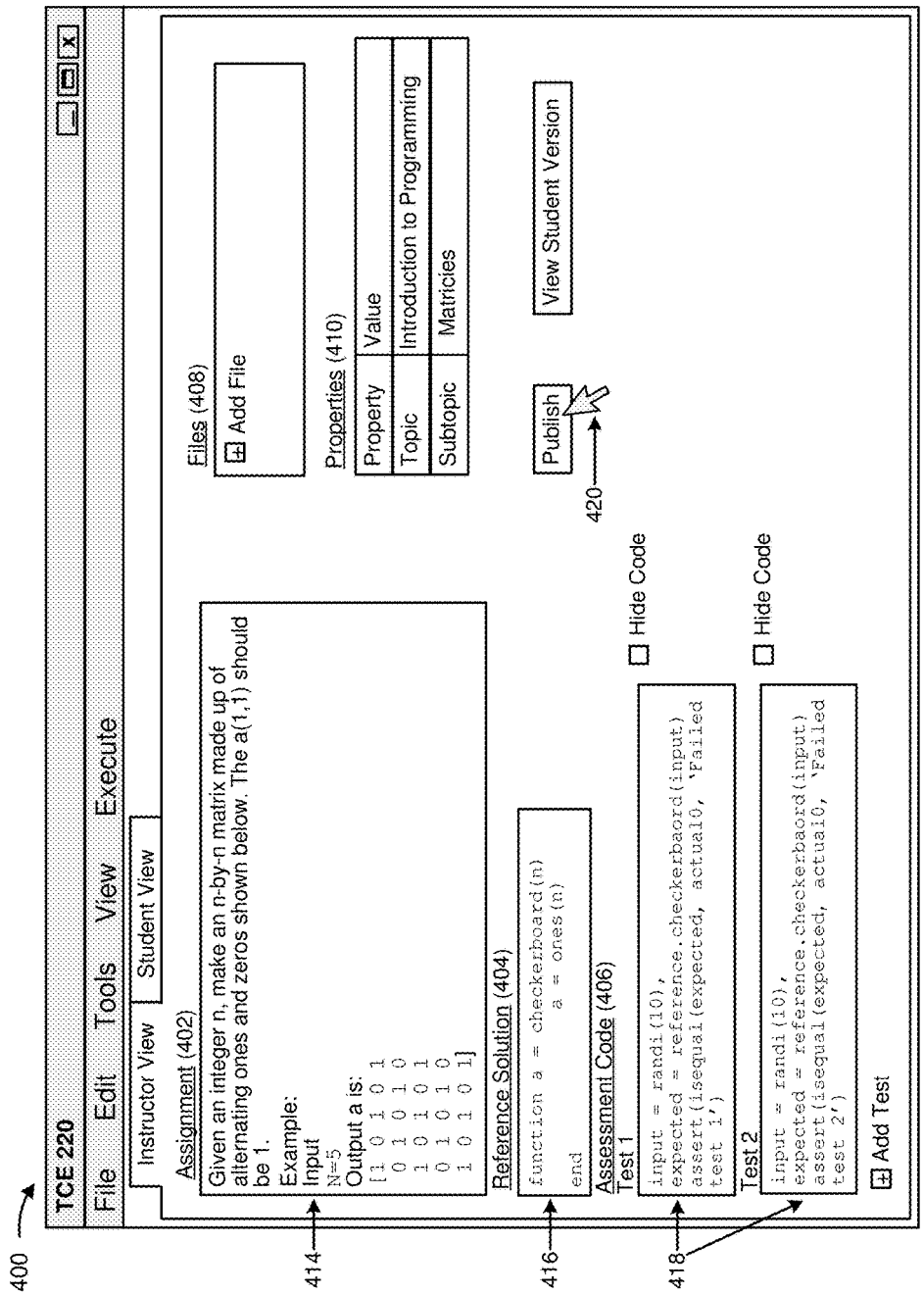

As shown in FIG. 4B, and by reference number 414, client device 210 receives input of information for inclusion in assignment module 402. The input represents a particular programming problem for solution by a student user. As shown by reference number 416, client device 210 receives information for inclusion in reference solution module 404. The input represents a solution template for the particular programing problem. As shown by reference number 418, client device 210 receives information for inclusion in assessment module 406. The input represents program code for a first test (e.g., "Test 1") and a second test (e.g., "Test 2") that are to be utilized to evaluate a solution by a student user. In another example, client device 210 may generate one or more tests for assessment module 406 based on utilizing a linear analysis tool (e.g., a program code analysis tool that generates program code tests) on the information of assignment module 402 and/or reference solution module 404. As shown by reference number 420, based on a user interaction with a button, client device 210 is instructed to encapsulate the set of modules in the single artifact.

Figure 4C:
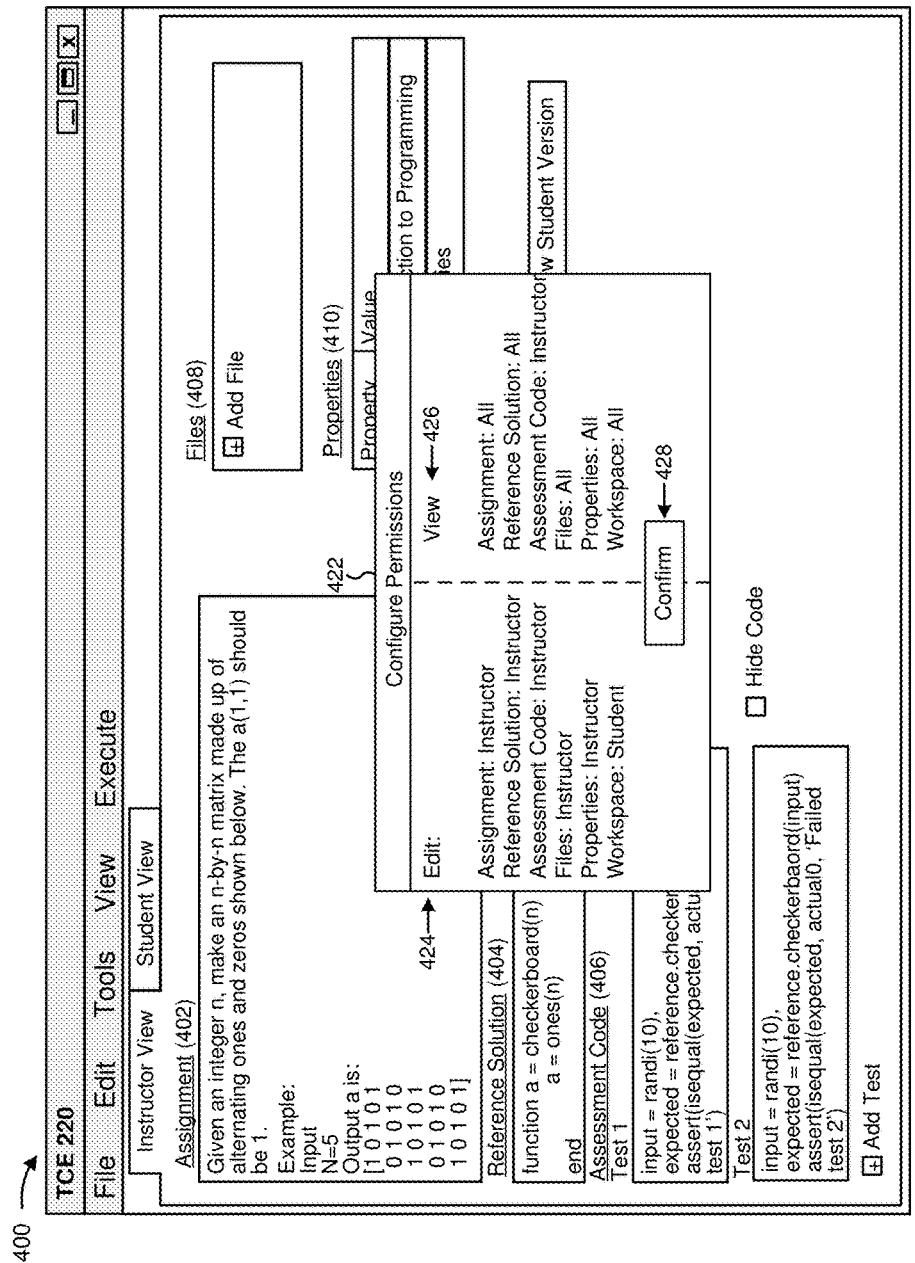

As shown in FIG. 4C, and by reference number 422, client device 210 provides a user interface element 422 (e.g., a pop-up window) for receiving user input regarding one or more permission levels for aspects of the set of modules. As shown by reference number 424, client device 210 receives a set of permissions relating to editing a module. For example, an instructor level user is permitted to edit the assignment module while a student is not permitted to edit the assignment module. As shown by reference number 426, client device 210 receives a set of permission relating to viewing a module. For example, an instructor level user is permitted to view the assessment code module but all users are permitted to view the assignment module. As shown by reference number 428, based on user interaction with a button, client device 210 confirms the sets of permissions indicated in user interface element 422.

Figure 4D:
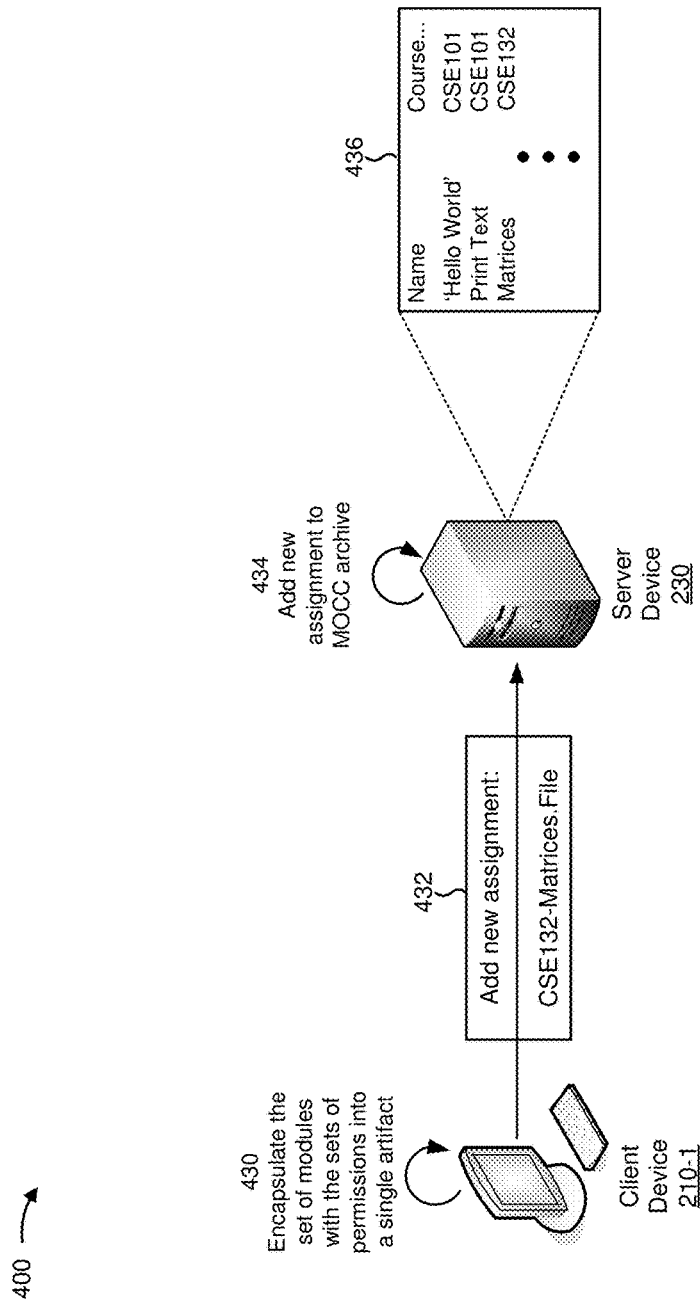

As shown in FIG. 4D, and by reference number 430, client device 210 encapsulates the set of modules with the sets of permissions into a single artifact. As shown by reference number 432, client device 210 provides the single artifact to server device 230 for storage via a data structure. As shown by reference number 434, server device 230 receives the single artifact and registers the artifact as a new assignment in a massive open online course (MOOC) archive data structure 436.

As indicated above, FIGS. 4A-4D are provided merely as an example. Other examples are possible and may differ from what was described with regard to FIGS. 4A-4D.

FIG. 5 is a diagram of an example implementation 500 of generating an educational artifact that encapsulates a set of modules.

As shown in FIG. 5, client device 210 provides a user interface in an instructor view (e.g., that facilitates editing of computer-based coursework, creation of computer-based coursework, or the like). As shown by reference number 502, client device 210 generates an assignment module that includes information identifying a graphical modeling assignment for a student. As shown by reference number 504, client device 210 generates a reference solution module with a graphical model representing an example solution to the assignment. As shown by reference number 506, client device 210 generates an assessment model module with a graphical model based test for evaluating a student solution to the assignment based on the reference solution. As shown by reference number 508, client device 210 generates a set of properties (e.g., a topic property, "Graphical Modeling," and a subtopic property, "Integrators"). Based on receiving an interaction with a user interface, client device 210 may encapsulate the set of modules with a set of permissions into a single artifact and provide the artifact to facilitate computer-based coursework for graphical modeling. In another example, each permission may be encapsulated with the module to which the permission applies.

As indicated above, FIG. 5 is provided merely as an example. Other examples are possible and may differ from what was described with regard to FIG. 5.

In this way, client device 210 may facilitate graphical modeling type computer-based coursework.

FIG. 6 is a flow chart of an example process 600 for generating an educational artifact that encapsulates a set of modules. In some implementations, one or more process blocks of FIG. 6 may be performed by client device 210. Additionally, or alternatively, one or more process blocks of FIG. 6 may be performed by another device or a set of devices separate from or including client device 210, such as TCE 220 and/or server device 230.

As shown in FIG. 6, process 600 may include receiving a set of modules for encapsulation in a single artifact (block 610). For example, client device 210 may receive the set of modules for encapsulation in the artifact. In some implementations, client device 210 may provide a user interface with which to select and/or create the set of modules. For example, client device 210 may provide the user interface with an instructor view. In the instructor view, the user may select a module to include in the artifact, edit information of a module, or the like. Encapsulation may refer to an association of multiple modules into a single artifact associated with a particular file format. For example, the set of modules may be intended for encapsulation in an education related artifact that may be utilized by a program operating on client device 210, server device 230, or the like to populate a user interface with information associated with the set of modules.

In some implementations, client device 210 may determine that the set of modules includes a module relating to an assignment for computer-based coursework. For example, client device 210 may receive input from a user indicating the artifact is to include an assignment module. Additionally, or alternatively, client device 210 may determine that the set of modules includes a solution template module, a test suite module, a workspace module, or the like. Additionally, or alternatively, client device 210 may determine that the set of modules includes a module associated with a set of supporting files, a module associated with a set of properties of the artifact, or the like.

In some implementations, client device 210 may determine that the set of modules includes one or more modules associated with a multiple choice type computer-based coursework. For example, client device 210 may receive user input indicating that the artifact is to include a module that is associated with generating a multiple choice question and receiving a selection of one of a set of answers. In this case, client device 210 may utilize a module associated with a pre-configured multiple choice question, a module associated with automatically generated random values based on a template multiple choice question, or the like. In this way, client device 210 may facilitate randomized multiple choice type computer-based coursework via a single artifact, thereby facilitating distribution of computer-based coursework to multiple students with a reduced likelihood of students sharing solutions relative to non-randomized based multiple choice coursework.

In some implementations, client device 210 may determine that the set of modules includes one or more modules that are associated with graphical modeling. For example, client device 210 may receive input indicating that the artifact is to include a particular type of workspace module that facilitates graphical modeling, selection of a multiple choice graphical modeling question, or the like. In this way, client device 210 may facilitate graphical modeling computer-based coursework via a single artifact, thereby reducing computer processing cycles relative to a multi-artifact configuration that includes downloading multiple files, loading the multiple files into multiple different program environments, and uploading multiple files back to a grading platform.

In some implementations, client device 210 may receive a selection of the set of modules based on user input. For example, a user may select, via one or more interactions with a user interface, which modules to include in the artifact. Additionally, or alternatively, the user may provide user input associated with information for inclusion in a particular module, such as a reference solution in a reference solution module, a file in a supporting files module, or the like. In some implementations, client device 210 may determine the set of modules. For example, client device 210 may determine one or more modules that are to be included in the artifact based on a default artifact configuration. Additionally, or alternatively, client device 210 may utilize a tool associated with TCE 220 to determine the set of modules, such as an automatic code generation tool, a linear analysis tool, a comparison tool, or the like. For example, client device 210 may generate a set of tests for a test suite module based on a reference solution in a reference solution module. Additionally, or alternatively, client device 210 may generate the reference solution in the reference solution module based on information included in an assignment module. For example, client device 210 may utilize a semantic processing tool, a natural language tool, or the like to interpret an assignment and generate a solution to the assignment using program code, a graphical model, or the like.

In some implementations, client device 210 may determine a restriction for a module. For example, client device 210 may receive input indicating that a particular aspect of a module is unavailable, such as making a particular library of functions unavailable for user in a workspace module when a student is solving a problem. In this case, client device 210 may store information with the module identifying the restriction to cause the restriction to be enabled when the artifact is executed by another client device 210. In this way, client device 210 may provide restriction functionality obviating the need for an instructor to provide custom versions of programming libraries, thereby saving memory space, and/or utilize anti-cheating software to detect violations of rules, thereby reducing processing requirements.

As further shown in FIG. 6, process 600 may include determining a set of permissions for the set of modules (block 620). For example, client device 210 may determine the set of permissions for the set of modules. An aspect of a module may be subject to a permission. For example, client device 210 may determine that all users are permitted to view an assignment module but that only an instructor is permitted to edit the assignment module (the instructor being identified by a user providing a credential). Similarly, client device 210 may determine that an instructor is permitted to view and/or edit a test suite module but a student is only permitted to cause a student solution to be evaluated using the test suite module without viewing contents of the test suite module. Other aspects of a module may be subject to a permission and levels of permission may differ from those that are described herein. When client device 210 generates a view of a user interface (e.g., an instructor view, a student view, or the like), client device 210 may determine with what information to populate the user interface based on the level of permission of a user (e.g., an instructor level, a student level, or the like).

In some implementations, client device 210 may determine the set of permissions based on user input. For example, client device 210 may receive an indication from a user that a particular module may be viewed, edited, and/or interacted with (e.g., via a user interface) by another user of another client device 210 associated with a particular level of permission (e.g., an instructor level, a student level, or the like). Additionally, or alternatively, client device 210 may determine the set of permissions based on one or more other artifacts with one or more other similar modules, based on information included in one or more modules, or the like. In this way, client device 210 may distribute all information of the artifact to all users, but only make particular information accessible based on a level of permission with which a particular user is associated, thereby obviating the need for multiple versions of a particular computer-based coursework. In this way, client device 210 may reduce memory usage relative to a computer-based coursework that requires multiple versions for multiple levels of user.

As further shown in FIG. 6, process 600 may include encapsulating the set of modules in the single artifact with the set of permissions (block 630). For example, client device 210 may encapsulate the set of modules in the artifact with the set of permissions. In some implementations, client device 210 may include the set of modules in the artifact with the set of permissions to prevent a user lacking a required level of permission from viewing information associated with the set of modules. For example, client device 210 may include an indication in the artifact that a solution template module is not to be provided for display in a user interface unless a user of client device 210 provides a credential associated with instructor level permission, thereby preventing a student level user from viewing information of the solution template module. In this way, multiple modules associated with the artifact may be included in the artifact without unauthorized users being capable of viewing particular modules.

In some implementations, client device 210 may modify one or more modules when encapsulating the set of modules. For example, client device 210 may convert program code from a first format to a second format. Additionally, or alternatively, client device 210 may generate program code associated with causing another client device 210, when utilizing the artifact, to generate a graphical model included in a module of the artifact. In this way, client device 210 may maintain operability with another client device 210 on which the artifact is utilized.

In some implementations, client device 210 may generate information associated with generating the set of modules. For example, client device 210 may generate program code, such as extensible markup language (XML) code, MATLAB code, or the like associated with causing another client device 210 to regenerate the set of modules for display via a user interface when the other client device 210 executes the program code. Further to the example, client device 210 may generate program code associated with a randomization feature of a module. For example, client device 210 may identify a module as a template for providing randomized values in an equation, and may generate code associated with causing a random value to be included in the equation when the artifact is executed. Additionally, or alternatively, client device 210 may generate information associated with one or more model elements of a graphical model related module of the set of modules. For example, client device 210 may generate information associated with generating a graphical model, a multiple choice question that includes a graphical model, a multiple choice question that is associated with execution of a graphical model, or the like.

As further shown in FIG. 6, process 600 may include providing the single artifact (block 640). For example, client device 210 may provide the artifact and/or information associated with the artifact after encapsulating the set of modules in the artifact with the set of permissions. In some implementations, client device 210 may provide the artifact. For example, client device 210 may transmit the artifact to a web platform associated with storing educational artifacts, to another client device 210 being utilized by another user (e.g., a student), to a massive open online course (MOOC) archive, or the like. In some implementations, client device 210 may provide the artifact for storage. For example, client device 210 may provide the artifact for storage in a data structure associated with server device 230. In some implementations, client device 210 may provide information regarding the artifact. For example, client device 210 may provide, to another client device 210 associated with another user (e.g., a student) information indicating that the artifact is available via a web platform.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, client device 210 may encapsulate multiple modules into a single artifact for utilization in a computer-based coursework context. Encapsulating the multiple modules with a set of permissions facilitates distributing the artifact to multiple users with each necessary artifact included, but a particular user only being provided one or more artifacts to which the particular user is intended to have access. In this way, client device 210 may reduce processing requirements, relative to a multi-artifact configuration, associated with downloading multiple files, loading different files into different environments, or the like.

FIGS. 7A-7D are diagrams of an example implementation 700 of utilizing an educational artifact that encapsulates a set of modules.

Figure 7A:
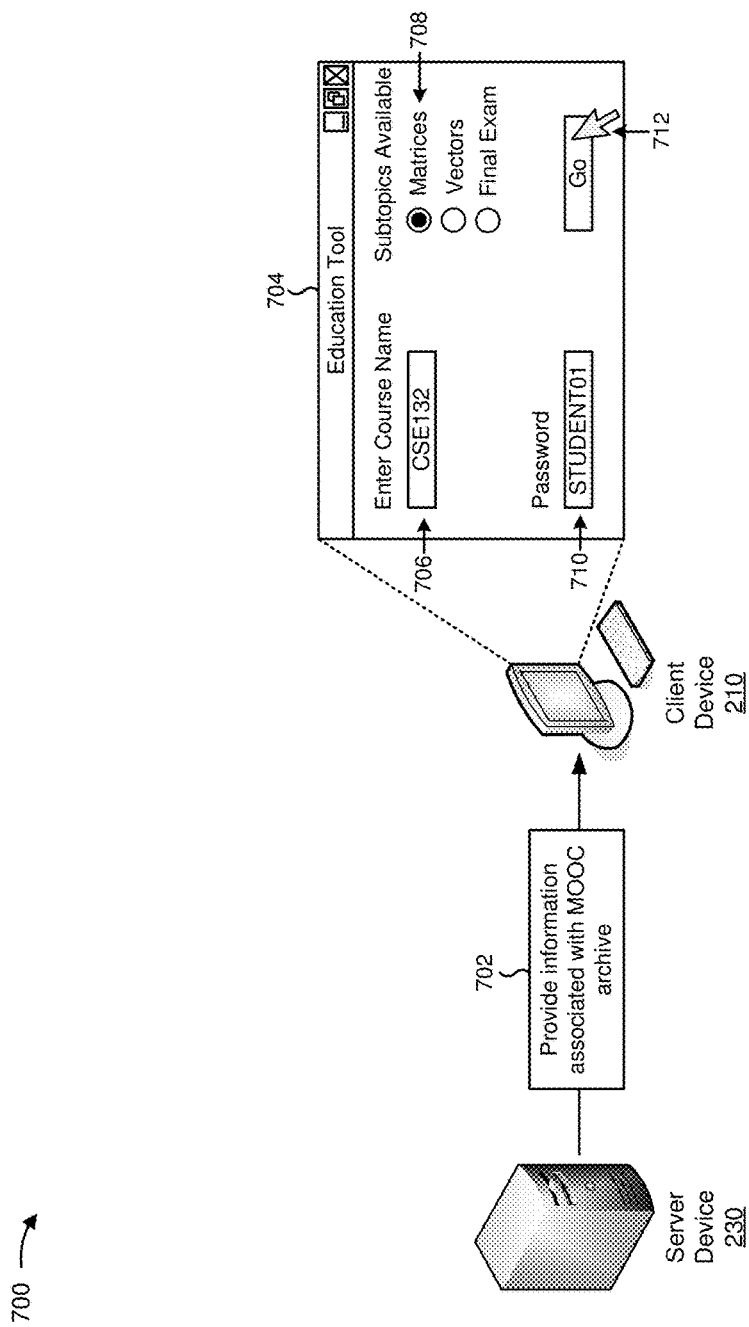
FIGS. 7A-7D are diagrams of an example implementation of utilizing an educational artifact that encapsulates a set of modules.

As shown in FIG. 7A, and by reference number 702, client device 210 receives, from server device 230, information identifying a set of artifacts obtainable from a data structure of server device 230 (e.g., a MOOC archive). The set of artifacts are computer-based coursework that may be completed by a user of client device 210. As shown by reference number 704, a user interface (e.g., "Education Tool") is provided for display by client device 210. As shown by reference numbers 706 and 708, client device 210 receives input of a course name and a subtopic corresponding to a single artifact of the set of artifacts. As shown by reference number 710, client device 210 receives user input of a password. Assume that the password indicates a student level of permission with regard to modules of the artifact. As shown by reference number 712, based on a user interaction with a button, client device 210 is instructed to obtain the artifact. Assume that client device 210 obtains the artifact and selects information associated with a set of modules of the artifact for display via the user interface based on the student level of permission. Further assume that the artifact is a similar artifact to the artifact generated in FIGS. 4A-4D.

Figure 7B:
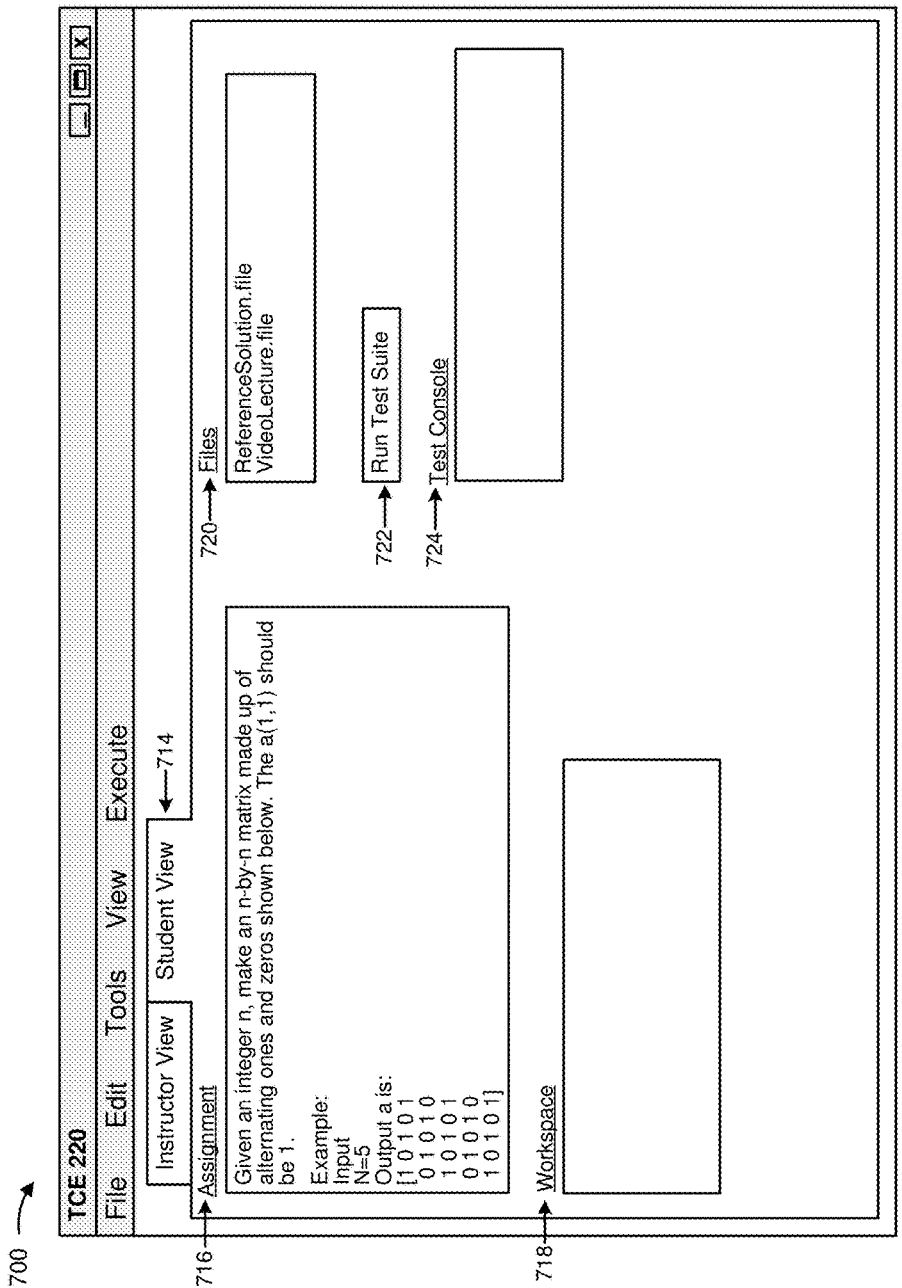

As shown in FIG. 7B, and by reference number 714, based on the student level of permission, client device 210 provides a student view of the artifact (e.g., a view with a particular set of modules visible to and/or editable by a student level user). As shown by reference number 716, client device 210 provides an assignment module 716 with information identifying the problem for the student to solve. Assume that the user may view the assignment module but may not edit the assignment module. As shown by reference number 718, client device 210 provides a workspace module 718 that includes a program code editor for solving the problem of assignment module 716. Assume that the user may view and edit contents of the workspace module. As shown by reference number 720, client device 210 provides a user interface element, for a files module 720, indicating a set of supporting files for the artifact. The set of supporting files includes a reference solution file, "ReferenceSolution.file," that is intended to be utilized by client device 210 to evaluate a student solution to the problem. The set of supporting files includes a video lecture file, "VideoLecture.file," that may be provided for display via the user interface to instruct the user regarding solving the problem and/or provided for utilization via another video playback interface. As shown by reference numbers 722 and 724, client device 210 provides a test suite module with a set of user interface elements for grading the student solution (e.g., a "Run Test Suite" button 722 for initiating evaluation of the student solution and a test console 724 user interface element for displaying results of the evaluation of the student solution). Assume that the user may interact with the Run Test Suite button, may view the test console, but may not edit the test console.

Figure 7C:
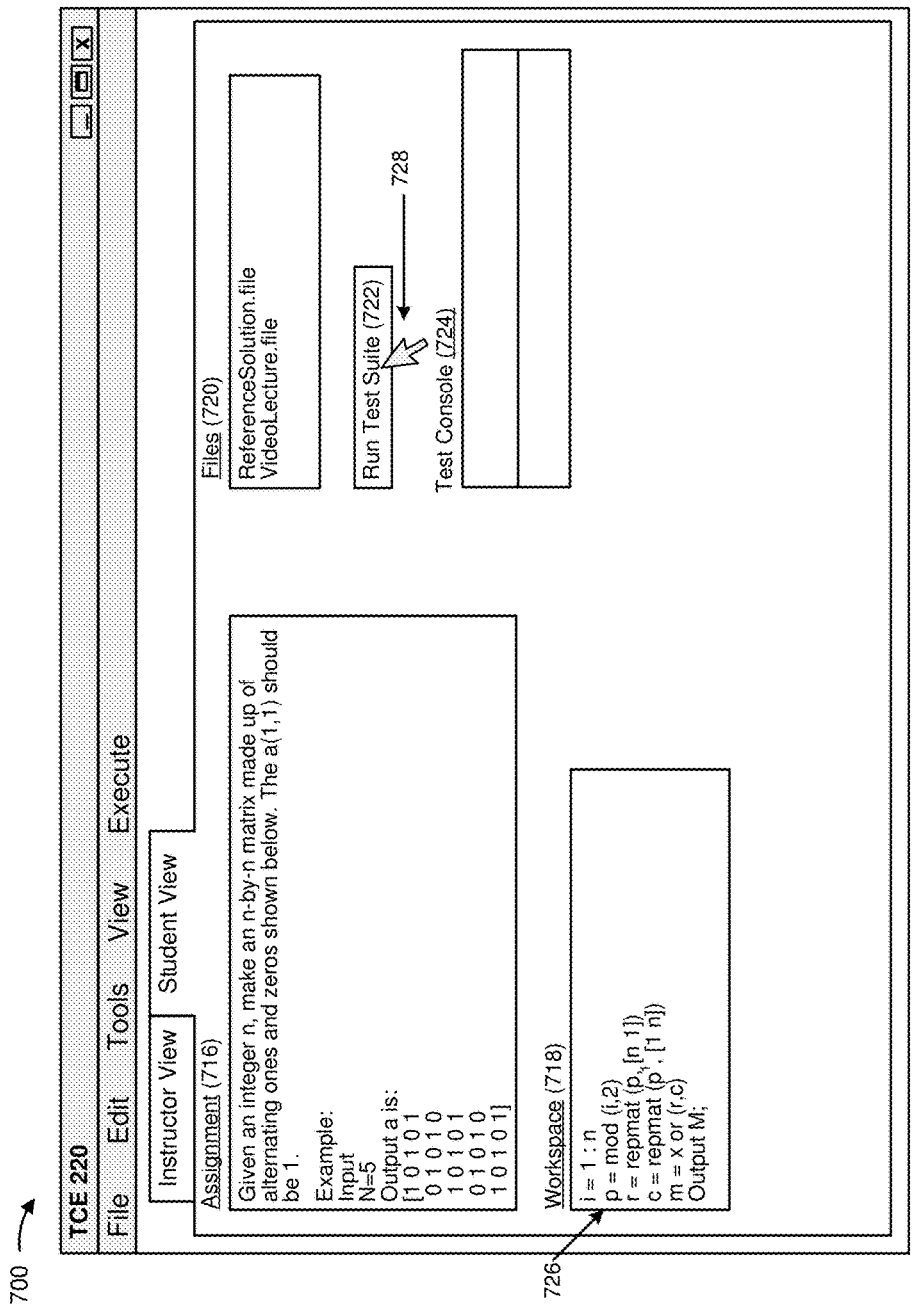

As shown in FIG. 7C, and by reference number 726, client device 210 receives input (e.g., program code representing a potential solution to the problem of assignment module 716) via workspace module 718. As shown by reference number 728, based on a user interaction with button 722, client device 210 evaluates the potential solution using the reference solution included in "ReferenceSolution.file."

Figure 7D:
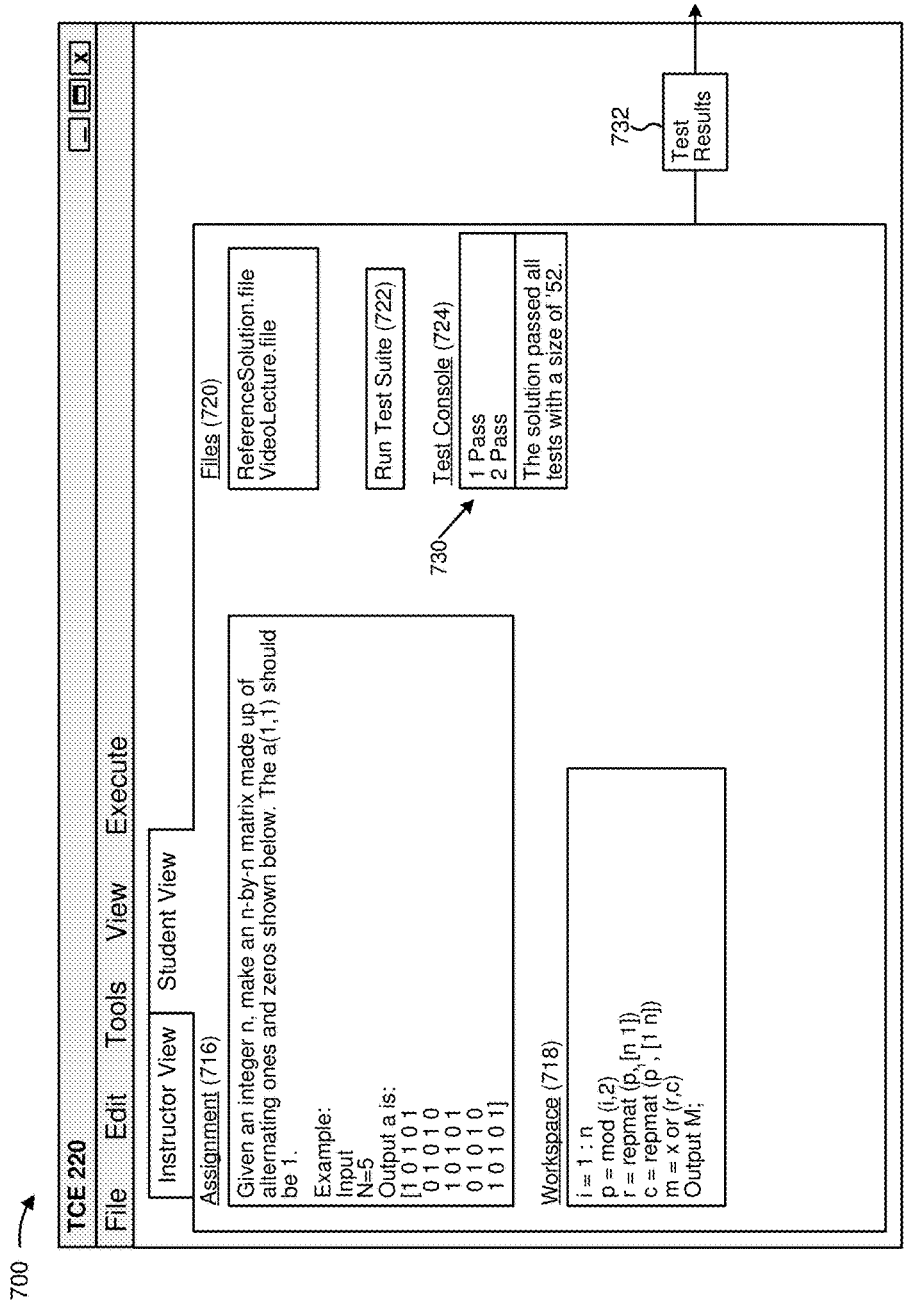

As shown in FIG. 7D, and by reference number 730, client device 210 provides, for display via test console 724, results of evaluating the potential student solution to the assignment of assignment module 716 (e.g., information indicating that a first test and a second test are passed by the solution because the solution is correct and information indicating a programmatic complexity of the potential solution relative to the reference solution). As shown by reference number 732, client device 210 provides information indicating results of evaluating the potential student solution (e.g., to server device 230 for review by an instructor).

As indicated above, FIGS. 7A-7D are provided merely as an example. Other examples are possible and may differ from what was described with regard to FIGS. 7A-7D.

Figure 8A:
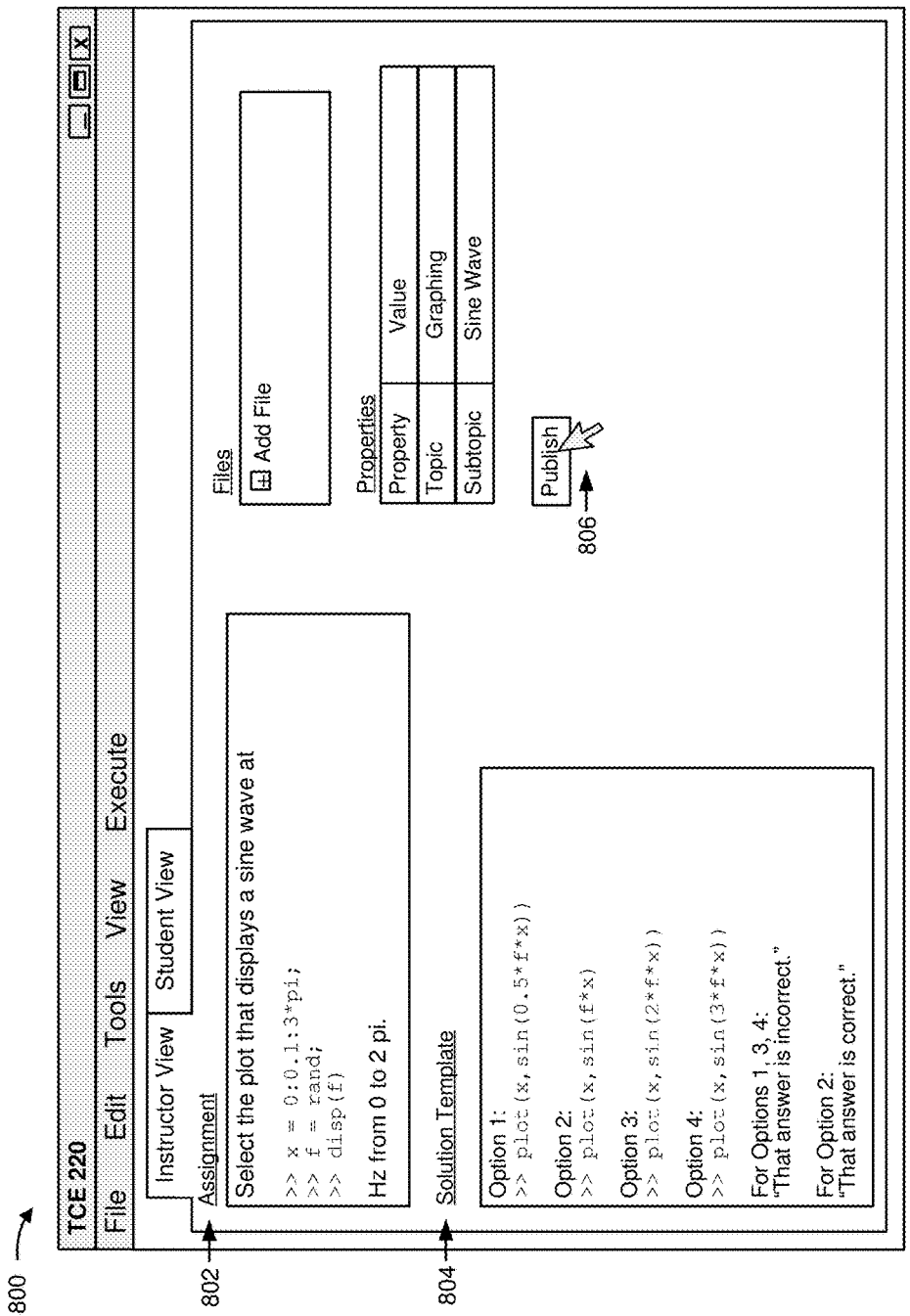
FIGS. 8A and 8B are diagrams of another example implementation of utilizing an educational artifact that encapsulates a set of modules.
Figure 8B:
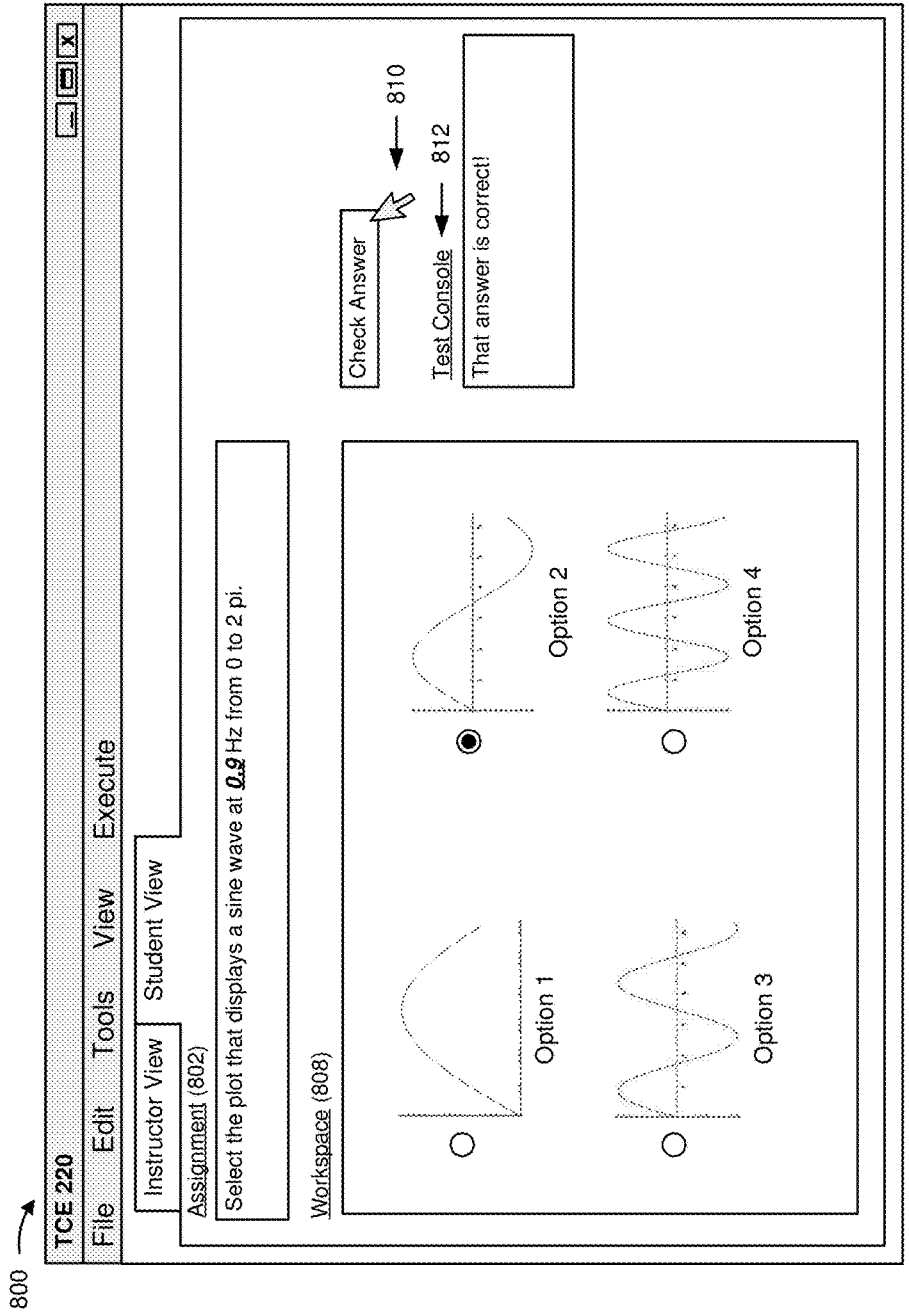

FIGS. 8A and 8B are diagrams of an example implementation 800 of utilizing an educational artifact that encapsulates a set of modules.

As shown in FIG. 8A, client device 210 provides a user interface for generating a single artifact in an instructor view. As shown by reference number 802, client device 210 receives input of a problem for student solution. The problem includes program code associated with randomly generating a value for a multiple choice question. In this way, client device 210 may facilitate computer-based coursework where multiple students receive different versions of the same problem. As shown by reference number 804, client device 210 receives input of a solution template. The solution template includes program code for generating multiple choice questions based on randomly generating the value associated with assignment module 802. The solution template includes an indication of a result when incorrect options 1, 3, and 4 are selected by a student user (e.g., "That answer is incorrect") and an indication of a result when correct option 2 is selected by the student user (e.g., "That answer is correct"). As shown by reference number 806, based on user interaction with a button, client device 210 is instructed to generate a single artifact that encapsulates assignment module 802 and solution template module 804. Assume client device 210 generates the artifact and that the artifact is then selected for utilization by a student level user.

As shown in FIG. 8B, client device 210 provides a student view of the artifact. As shown by reference number 802, client device 210 provides assignment module 802 including the problem with a randomly generated value (e.g., 0.9). As shown by reference number 804, client device 210 provides workspace module 808 including a set of graphs, which correspond to the program code of solution template module 804, as answer choices for the problem. As shown by reference number 810, after receiving a user selection of a graph (e.g., "Option 2"), client device 210 detects a user interaction with a button (e.g., associated with a test suite module). As shown by reference number 812, client device 210 evaluates the student solution to the multiple choice problem and provides a result (e.g., "That answer is correct").

As indicated above, FIGS. 8A and 8B are provided merely as an example. Other examples are possible and may differ from what was described with regard to FIGS. 8A and 8B.

In this way, client device 210 may facilitate multiple choice type computer-based coursework.

FIG. 9 is a flow chart of an example process 900 for utilizing an educational artifact that encapsulates a set of modules. In some implementations, one or more process blocks of FIG. 9 may be performed by client device 210. Additionally, or alternatively, one or more process blocks of FIG. 9 may be performed by another device or a set of devices separate from or including client device 210, such as TCE 220 and/or server device 230.

As shown in FIG. 9, process 900 may include receiving a single artifact including a set of modules (block 910). For example, client device 210 may receive the single artifact. In some implementations, client device 210 may obtain an artifact (e.g., the single artifact) from a web platform, such as a university website, a course website, a MOOC website, or the like. For example, client device 210 may access a data structure associated with storing the artifact and may download the artifact for execution via a program associated with executing the artifact (e.g., a program that generates a user interface with which to display information associated with one or more modules of the artifact). In some implementations, client device 210 may receive the artifact from another client device 210. For example, a first client device 210 being utilized by an instructor may provide the artifact to one or more second client devices 210 being utilized by one or more students. In some implementations, client device 210 may receive the artifact with a request that information of the artifact be provided via a user interface. For example, client device 210 may receive, via a user interface, a request to provide one or more modules of the artifact via the user interface.

As further shown in FIG. 9, process 900 may determining a level of permission associated with a user of the artifact (block 920). For example, client device 210 may determine the level of permission associated with the user of the artifact. In some implementations, client device 210 may determine different levels of permission for different users and may permit utilization of different aspects of a module based on the different levels of permission. For example, client device 210 may determine that a user is associated with an instructor level of permission, a student level of permission, or the like. In this case, the level of permission may correspond to one or more permissions associated with a module that dictate a type of user (e.g., an instructor, a student, etc.) that may utilize an aspect of the module (e.g., viewing information of the module, editing information of the module, etc.). In some implementations, the levels of permission may be hierarchical (e.g., an instructor level user is granted access to more aspects of a module than a student level user). Additionally, or alternatively, the levels of permission may be non-hierarchical (e.g., an instructor level user is granted access to different aspects of a module via different user interface elements than a student level user).

Although implementations, described herein, are described in terms of an instructor level of permission and a student level of permission, implementations described herein may utilize other levels of permission, different quantities of levels of permissions, or the like. For example, client device 210 may determine that a user is associated with an instructor level of permission, a professor level of permission, a graduate student level of permission, a teaching assistant level of permission, a grader level of permission, a student level of permission, an auditor level of permission, a supervisor level of permission, or another type of level of permission.

In some implementations, client device 210 may receive a credential from the user, such as a username, a password, a passkey, or the like, and may determine the level of permission for the user based on the credential. For example, client device 210 may receive a password from a user indicating that the user is an instructor. Additionally, or alternatively, client device 210 may determine the level of permission based on a version of a program for executing the artifact that the user is utilizing. For example, when the program includes an instructor version and a student version, client device 210 may determine an instructor level of permission for the user when the user is using the instructor version and a student level of permission when the user is using the student version.

As further shown in FIG. 9, process 900 may include providing, via a user interface, information associated with one or more modules, of the set of modules, based on the level of permission (block 930). For example, client device 210 may provide, via the user interface, information associated with one or more modules based on the permission. In some implementations, client device 210 may provide an instructor level view via the user interface. For example, client device 210 may provide a user interface with which to receive user input associated with selecting one or more modules for encapsulation, providing information for inclusion in a module (e.g., a problem for inclusion in an assignment module, a solution template for inclusion in a reference solution module, program code for inclusion in a test suite module, etc.), or the like.

Additionally, or alternatively, client device 210 may provide a student level view via the user interface. For example, client device 210 may provide a user interface with which to receive user input associated with completing computer-based coursework (e.g., an assignment module with which to display a problem, a workspace module with which to receive a solution, a user interface element associated with causing a test suite module to evaluate the solution against a set of tests of the test suite module that are not visible to the user, etc.), or the like.

In some implementations, client device 210 may select a module from the set of modules to provide via the user interface. For example, client device 210 may determine that the module is associated with being viewed when a student level of permission is provided and may provide the module in a viewable format based on determining a student level of permission. Additionally, or alternatively, client device 210 may determine that the module is associated with being edited when an instructor level of permission is provide and may provide the module in an editable format based on determining an instructor level of permission. In this way, client device 210 may facilitate altering of information of the module.

In some implementations, client device 210 may provide an aspect of a module via the user interface based on the level of permission. For example, client device 210 may provide, for a test suite module in an instructor level view, a first user interface element with which to receive program code for evaluating a student solution. Additionally, or alternatively, client device 210 may provide, for the test suite module in a student level view, a second user interface element associated with causing the student solution to be evaluated and a third user interface element with which to provide results of evaluating the student solution.

In some implementations, client device 210 may generate the user interface when providing the one or more modules via the user interface. For example, client device 210 may generate a set of user interface elements associated with causing information of the one or more modules to be displayed, such as a button, a text editor, a program code development environment, a check box, a label, a graph, or the like. Additionally, or alternatively, client device 210 may configure one of the user interface elements based on a module of the one or more modules. For example, when client device 210 stores a restriction against a code library for use by a student user when solving a problem, client device 210 may configure the program code development environment to reject usage of the code library, may configure a test suite to reject a student solution that includes the code library, or the like.

As further shown in FIG. 9, process 900 may include updating the user interface based on one or more user interactions with the user interface (block 940). For example, client device 210 may update the user interface based on detecting one or more user interactions with the user interface. In some implementations, client device 210 may detect a user interaction with a user interface element associated with a module and may update the user interface based on the user interaction and/or based on information associated with the module. For example, client device 210 may detect a press of a button associated with causing a student solution to be evaluated, and client device 210 may evaluate the student solution. Additionally, or alternatively, client device 210 may detect a button press associated with adding a supporting file to a files module of the artifact and may provide one or more user interface elements associated with identifying the supporting file.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

In this way, client device 210 may utilize a single artifact to provide computer-based coursework with multiple levels of permission, thereby reducing a quantity of files that are necessary to be downloaded to a computer to perform computer-based coursework, a quantity of interactions between client device 210 and a web platform storing computer-based coursework, or the like relative to a multiple artifact computer-based coursework.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Program code (sometimes referred to herein as code) is to be broadly interpreted to include text-based code that may not require further processing to execute (e.g., C++ code, Hardware Description Language (HDL) code, very-high-speed integrated circuits (VHSIC) HDL (VHDL) code, Verilog code, Java code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like. In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may be of any type, such as a function, a script, an object, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A computer-readable medium storing instructions, the instructions comprising:

one or more instructions that, when executed by one or more processors, cause the one or more processors to:
  determine a set of modules for encapsulation in a single artifact,
    the set of modules being associated with being provided via a user interface for computer-based coursework, and
    the set of modules including an assignment module;
  determine permissions corresponding to the set of modules,
    the permissions including a first permission being associated with a first module of the set of modules,
      the first permission dictating a type of user to which an aspect of the first module is to be provided,
    the permissions including a second permission being associated with a second module of the set of modules,
      the second permission dictating a type of user to which an aspect of the second module is to be provided,
      the second permission being a different level of permission than the first permission;
  encapsulate the set of modules in the single artifact with the permissions,
    the single artifact, having the encapsulated set of modules with the permissions, being a file associated with a file format that is executable by a program corresponding to the file format;
  provide the single artifact, having the encapsulated set of modules with the permissions, to be accessible by a plurality of users via the user interface for computer-based coursework,
    at least some different aspects of the single artifact being accessible or inaccessible to different users based on the permissions and a type of user accessing the single artifact, and
    the plurality of users including a user that is permitted to access the aspect of the first module and not permitted to access the aspect of the second module;
  receive, via the user interface, a request to evaluate a solution to an assignment of the assignment module; and
  evaluate the solution to the assignment.

2. The computer-readable medium of claim 1, where the one or more instructions, when executed by the one or more processors, further cause the one or more processors to:
  receive a request for the single artifact to be provided for display via the user interface;
  determine a level of permission associated with a user based on receiving the request,
    the level of permission indicating a particular type of user,
      the particular type of user corresponding to the first permission,
      the particular type of user not corresponding to the second permission;
  select one or more modules, of the set of modules, based on the level of permission and the permissions corresponding to the set of modules,
    the one or more modules including the first module,
    the one or more modules not including the second module; and
  provide information associated with the selected one or more modules for display via the user interface.

3. The computer-readable medium of claim 1, where the one or more instructions, when executed by the one or more processors, further cause the one or more processors to:
  generate one or more tests based on the set of modules; and
  where the solution to the assignment is evaluated based on the one or more tests.

4. The computer-readable medium of claim 1, where the one or more instructions, when executed by the one or more processors, further cause the one or more processors to:
  determine a restriction on a particular module of the set of modules; and
  where the one or more instructions, that cause the one or more processors to encapsulate the set of modules, further cause the one or more processors to:
    encapsulate information associated with the restriction on the particular module; and
    provide information associated with the particular module for display via the user interface with the restriction incorporated.

5. The computer-readable medium of claim 1, where the first module and the second module are a same module; and
  where the first permission relates to viewing information of the same module and the second permission related to editing information of the same module; and
  where the one or more instructions, when executed by the one or more processors, further cause the one or more processors to:
    receive a request for information associated with the same module to be provided for display to a user via the user interface;
    determine that the user is a student level user,
      the first permission indicating that the student level user may view the same module,
      the second permission indicating that the student level user may not edit the same module; and
    provide information associated with the same module for viewing via the user interface based on determining that the user is the student level user,
      the user not being permitted to edit the information associated with the same module.

6. The computer-readable medium of claim 1, where the set of modules includes one or more modules associated with a graphical modeling type computer-based coursework; and
  where the one or more instructions, that cause the one or more processors to encapsulate the set of modules, further cause the one or more processors to:
    include, in the single artifact, information associated with generating a graphical model associated with the set of modules.

7. The computer-readable medium of claim 1, where the one or more instructions, when executed by the one or more processors, further cause the one or more processors to:
  receive a first request from a first user to provide information associated with the single artifact via the user interface;
  execute program code associated the assignment module to generate a first assignment for the first user;
  receive a second request from a second user to provide information associated with the single artifact via the user interface; and
  execute the program code associated with the assignment module to generate a second assignment for the second user,
    the second assignment being different from the first assignment.

8. A method, comprising:
receiving, by a device, a selection of a plurality of modules,
the plurality of modules including an assignment module, a solution template module, and a test suite module;
determining, by the device, levels of permission for one or more aspects of each module of the plurality of modules,
information of the assignment module being viewable by an instructor level of user and a student level of user and editable by the instructor level of user and not editable by the student level of user,
the instructor level of user being a hierarchically different level of user than the student level of user,
information of the solution template module being viewable and editable by the instructor level of user,
information of the test suite module being editable and viewable by the instructor level of user and not editable or viewable by the student level of user;
encapsulating, by the device, the plurality of modules in a single artifact with the levels of permission,
the single artifact, having the encapsulated plurality of modules with the levels of permission, being a file associated with a file format that is executable by a program corresponding to the file format;
providing, by the device, the single artifact, having the encapsulated plurality of modules with the levels of permission, to be accessible by a plurality of users via a user interface for computer-based coursework,
at least some different aspects of the single artifact being accessible or inaccessible to different users based on the levels of permission and a type of user accessing the single artifact, and
the plurality of users including a student level of user that is permitted to view the information of the assignment module and not permitted to edit the information of the assignment module,
receiving, by the device and via the user interface, a request to evaluate a solution to an assignment of the assignment module; and
evaluating, by the device, the solution to the assignment.

9. The method of claim 8, further comprising:
determining a user accessing the single artifact is the instructor level of user; and
where providing the single artifact further comprises:
providing information of the assignment module in a viewable and editable format;
providing information of the solution template module in a viewable and editable format; and
providing information of the test suite module in a viewable and editable format.

10. The method of claim 8, further comprising:
determining that a user accessing the single artifact is the student level of user; and
where providing the single artifact further comprises:
providing information of the assignment module in a viewable format when providing the single artifact,
the user not being permitted to edit the assignment module,
information of the solution template module being omitted from view via the user interface when providing the plurality of modules; and
providing a first user interface element associated with causing the device to evaluate a solution via the test suite module and a second user interface element associated with displaying results of evaluating the solution via the test suite module when providing the plurality of modules.

11. The method of claim 10, further comprising:
providing a workspace module when providing the single artifact,
the workspace module facilitating authorship of program code;
evaluating the program code via the test suite module after receiving input of the program code; and
providing a result of evaluating the program code for display.

12. The method of claim 10, further comprising:
providing a workspace module when providing the single artifact,
the workspace module facilitating generating of a graphical model;
evaluating the graphical model via the test suite module after receiving input associated with generating the graphical model; and
providing a result of evaluating the graphical model for display.

13. The method of claim 8, where the solution template module includes program code for solving the assignment; and
further comprising:
applying a program code analysis tool to the program code of the solution template module;
generating a set of program code tests based on applying the program code analysis tool; and
including the set of program code tests in the test suite module,
the test suite module being associated with evaluating the solution to the assignment utilizing the set of program code tests.

14. The method of claim 8, further comprising:
providing, before encapsulating the plurality of modules, an instructor view of the user interface to the instructor level of user,
the instructor view of the user interface facilitating editing of computer-based coursework of the plurality of modules; and
providing, after encapsulating the plurality of modules, a student view of the user interface to the student level of user,
the student view of the user interface facilitating completion of computer-based coursework of the plurality of modules.

15. A device, comprising:
one or more processors to:
receive a single artifact,
the single artifact encapsulating a plurality of modules with permissions associated with generating a user interface for computer-based coursework,
the plurality of modules including an assignment module,
the single artifact, having the encapsulated plurality of modules with the permissions, being a file associated with a file format that is executable by a program corresponding to the file format,
a first module, of the plurality of modules, being associated with a first permission of the permissions,
the first permission permitting the first module to be edited and viewed by an instructor level of user and permitting the first module to be viewed but not edited by a student level of user, a second module, of the plurality of modules, being associated with a second permission of the permissions,
the second permission permitting the second module to be edited and viewed by the instructor level of user and not permitting the second module to be viewed or edited by the student level of user,
the instructor level of user being a hierarchically higher level of user than the student level of user;
present on the user interface with first information and one or more user interface elements based on the plurality of modules, the permissions, and a level of user of a user utilizing the user interface when the level of user is the student level of user;
present on the user interface with second information based on the plurality of modules, the permission, and the level of user of the user utilizing the user interface when the level of user is the instructor level of user,
the second information coming from the single artifact and being selected to be different than the first information based on a different level of user;
receive, via the user interface, a request to evaluate a solution to an assignment of the assignment module; and
evaluate the solution to the assignment.

16. The device of claim 15, where the level of the user is the student level of user; and where the one or more processors, when presenting on the user interface with the first information, further:
provide user interface element for displaying information of the first module based on the first permission and the level of the user being the student level of user, information of the second module being omitted from view in the user interface based on the second permission and the level of the user being the student level of user.

17. The device of claim 15, where the level of the user is the instructor level of user; and
where the one or more processors, when presenting on the user interface with the first information, further:
provide first user interface element associated with displaying information of the first module and receiving user input associated with altering the information of the first module; and
provide a second user interface element associated with displaying information of the second module and receiving user input associated with altering the information of the second module.

18. The device of claim 17, where the one or more processors further:
receive user input associated with altering the information of the first module to generate altered information; and
encapsulate the plurality of modules in the single artifact with the permissions, the single artifact including the altered information.

19. The device of claim 15, where the one or more processors when presenting on the user interface with the first information, further:
include, in the user interface, a program code editor associated with receiving user input of the solution to the assignment;
receive input, via the program code editor, of the solution; and
where the solution is evaluated utilizing information of a test suite module of the plurality of modules.

20. The device of claim 15, where the one or more processors further:
determine that the single artifact includes a set of supporting files associated with one or more modules of the plurality of modules; and
integrate the set of supporting files into the one or more modules.

* * * * *